April 11, 1944.  W. E. KING  2,346,380
SWIVEL
Filed Dec. 23, 1940  2 Sheets-Sheet 1
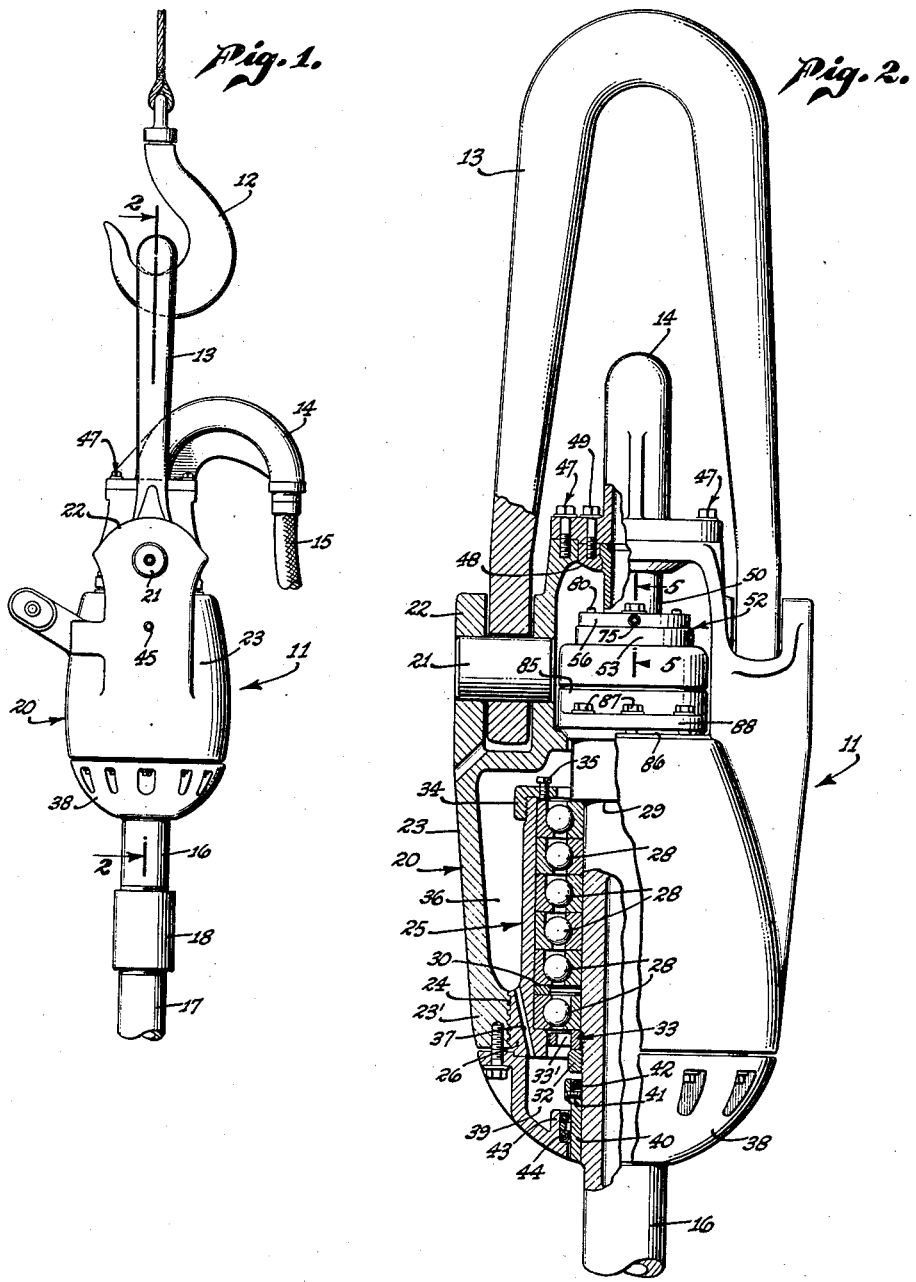
INVENTOR:
WALTER E. KING,
BY
ATTORNEYS.

April 11, 1944.  W. E. KING  2,346,380
SWIVEL
Filed Dec. 28, 1940  2 Sheets-Sheet 2
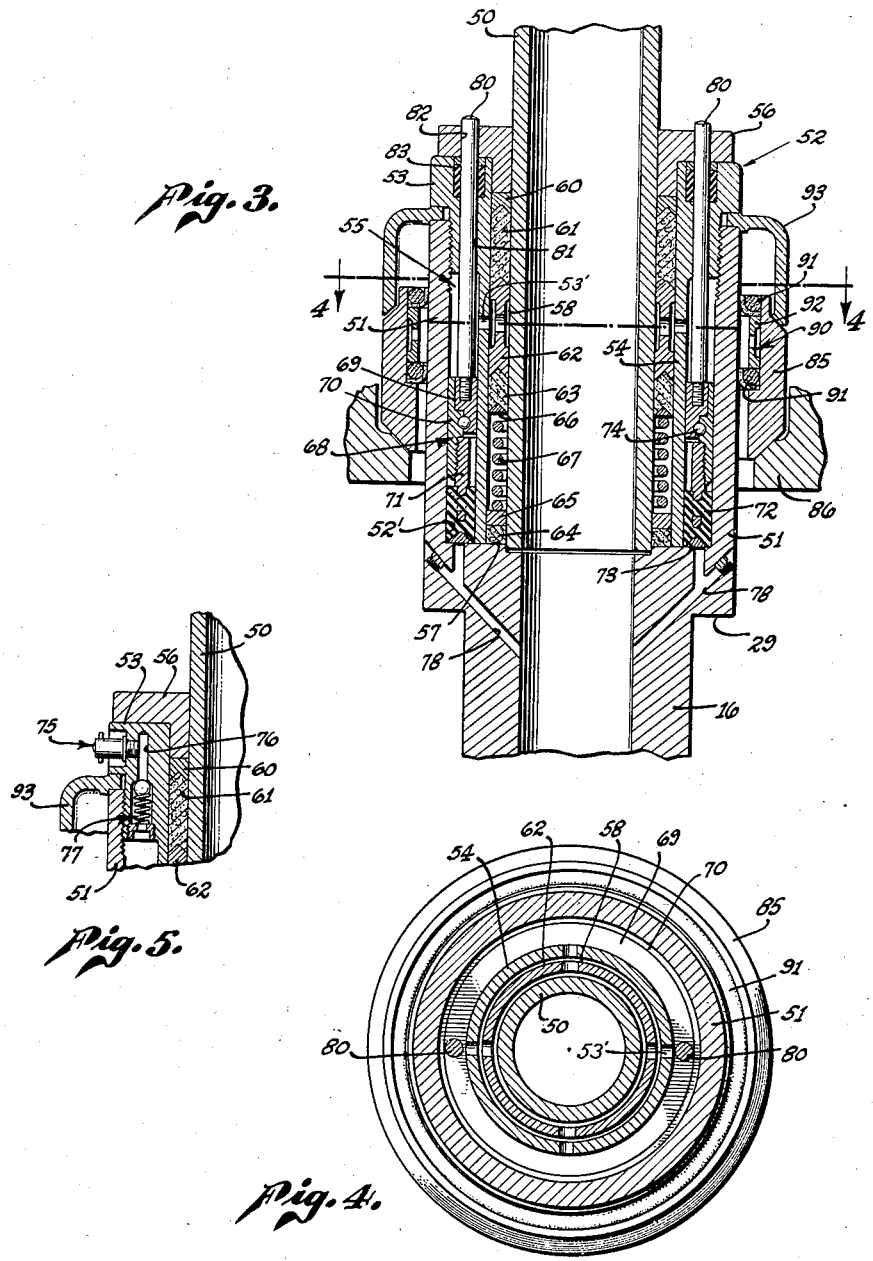
INVENTOR:
WALTER E. KING,
BY
ATTORNEYS.

Patented Apr. 11, 1944

2,346,380

UNITED STATES PATENT OFFICE 2,346,380

SWIVEL

Walter E. King, Houston, Tex.

Application December 28, 1940, Serial No. 372,098

4 Claims. (Cl. 255—25)

This invention relates generally to swivels such as are ordinarily used in rotary drilling of oil wells for rotatably suspending the drill pipe.

It is an object of this invention to provide a new and improved swivel for use in rotary drilling of oil wells where a circulating fluid is used embodying a plurality of anti-friction bearings for supporting the radial and thrust loads. Swivels ordinarily are provided with a bail, the ends of which are secured to pins in the housing of the swivel. As is well known, any substantially annular housing suspended in this manner and subjected to great loads has a tendency to be distorted by being bowed or bent out of round in a manner similar to an ordinary bucket which is overloaded. One of the principal causes of bearing failures in ordinary swivels is misalignment of the parts caused by such distortion of the housing. It is therefore a particular object of this invention to provide a housing construction whereby any distortion of the main housing caused by the above described action will not be transmitted to or affect the portion of the housing in the region of the anti-friction bearings. In this connection it is a particular object to provide a swivel construction employing an inner housing for supporting the anti-friction bearings which is mounted within the outer housing in such a manner that any distortion of the outer housing will not affect the inner housing to cramp or otherwise interfere with operation of the anti-friction bearings.

It is a further object of this invention to provide a means for circulating lubricant through the anti-friction bearings during rotation of the rotatable parts of the swivel and in this connection it is also an object to provide a lubricant chamber or reservoir of sufficient capacity and so located as to be effective for cooling the lubricant.

It is a still further object of this invention to provide a new and improved stuffing box or packing means for sealing the juncture of the rotatable stem of the swivel and the wash pipe to prevent leakage of the drilling fluid. In this connection it is a particular object to utilize the pressure of the drilling fluid to increase the effectiveness of the seal. It is also an object to employ a lubricant such as grease or the like in the region of the seal or packing means and to subject the lubricant to sufficient pressure to prevent any extrusion of the drilling fluid in this region. It is also an object to provide a means for indicating the amount of lubricant available within the sealing or packing region.

It is a still further object of this invention to provide a swivel so constructed that the gooseneck may be readily removed and the stuffing box or sealing parts readily removed and replaced without dismantling the swivel.

These and other objects will be apparent from the drawings and the following description thereof. Referring to the drawings, which are for illustrative purposes only;

Fig. 1 is a sectional elevation of a swivel embodying a form of the invention;

Fig. 2 is an enlarged sectional elevation of the swivel of Fig. 1 taken on line 2—2 thereof;

Fig. 3 is an enlarged detailed sectional view through the stuffing box or stem sealing means of Fig. 2;

Fig. 4 is a sectional plan view on line 4—4 of Fig. 3; and

Fig. 5 is an enlarged fragmentary sectional view of the means for supplying the seal means with a suitable lubricant as taken on line 5—5 of Fig. 2.

More particularly describing the invention reference numeral 11 generally indicates the swivel which is shown suspended from a hook 12 by means of the bail 13 forming part of the swivel. The swivel is provided at its upper end with a hollow gooseneck fitting 14 which is adapted to be connected by means of a suitable flexible conduit 15 to a supply of drilling fluid such as is ordinarily known as rotary mud. The swivel is provided with a hollow rotatable stem 16 which is adapted to be connected to drill pipe 17 by any suitable fitting 18.

The swivel comprises an outer housing 20 provided at its upper end with a pair of bail or supporting pins 21 by means of which the bail 13 is attached to the housing. These bail pins are positioned in the spaced extending portions 22 which are formed on the top of the major portion 23 of the housing which is generally annular in form. The lower end of the housing portion 23 terminates in a thickened annular portion 23' provided with the internal screw threads 24. An inner housing 25 provided with a thickened screw threaded lower end portion 26 is mounted within the outer housing as shown and extends upwardly therein. This inner housing is adapted to support a plurality of anti-friction bearings which are shown as comprising several rows of ball bearings 28. The stem 16 is adapted to extend upwardly through the inner housing and be supported by the bearings 28.

The hollow stem 16 is provided with a shoulder 29 which is adapted to be supported on the inner race of the uppermost row of bearings. In this connection since the swivel is ordinarily required to support great weights, the greater number of the bearings are adapted to support the thrust loads on the stem tending to pull the stem out of the housing. Thus, in the form shown the upper five rows of bearings are adapted to support the stem 16 and any load thereon. Between the lowermost row of bearings and the next higher row of bearings is a spacer ring 30. The lowermost row of bearings is particularly adapted to support any loads tending to thrust the stem 16 upwardly with relation to the housing.

Although a particular type and number of rows of bearings has been shown for supporting both the thrust and radial loads, it is contemplated that various other types and number of rows of anti-friction bearings adapted for supporting both the thrust and radial loads may be utilized between the inner housing 25 and the stem 16.

A bearing adjustment nut 32 is threaded on to the stem 16 to permit a means of tightening the bearings and preventing play. Between the bearing adjustment nut 32 and the lowermost row of bearings is an impeller 33 the purpose of which will hereinafter become apparent. A cap ring 34 is provided at the upper end of the inner housing to engage the outer race of the upper row of bearings by means of adjustment bolts 35.

The inner and outer housings cooperate to provide an annular chamber 36 which is adapted to act as a lubricant reservoir. Any number of suitable passageways 37 are provided in the lower end of the inner housing 25 to provide communication between the lower end of the chamber 36 and the lower end of the bearings. Bolted to the lower end of the housing as shown is a lower case 38 which provides an annular space 39 in communication with the reservoir 36 by means of the aforementioned passageways 37.

A suitable sealing means is provided between the lower case 38 and the stem and in the form shown comprises a sleeve 40 secured to the stem by means of a screw 41 and provided with an oil seal 42 at its upper end. There is also provided in the lower case a suitable upwardly extending annular flange 43 and oil seal means 44 between it and the sleeve 41.

With this construction when the hollow stem 16 is rotated by the ordinary drilling operations, the impeller 33 rotates therewith causing the circulation of lubricant from the oil reservoir to the chamber or space 39 and upwardly through the various bearings where it is returned to the oil reservoir. In this connection it is pointed out that the impeller 33 is provided with veins 33' which are inclined in a direction to cause upward flow of lubricant therethrough when the stem is rotated in the ordinary manner. Although the lubricant may become somewhat heated in passing through the bearings, with the construction provided ample opportunity is given for it to cool in the reservoir or chamber 36. The supply of lubricant may be replenished by means of a suitable fitting 45 communicating with the interior of the lower case.

At its upper end the swivel is provided with the aforementioned gooseneck fitting 14 which is bolted directly to the swivel housing at 47. This fitting is provided at its inner end with a removable wash pipe socket ring 48 which is attached to the fitting by suitable bolts 49 and is adapted to accommodate the upper end of a wash pipe 50. The wash pipe is received in the enlarged upper end 51 of the hollow stem 16.

It is a particular feature of this invention to provide a new and improved means for sealing the junction of the stem and wash pipe, such means being generally indicated by reference numeral 52 and most clearly illustrated in Figs. 3 and 4. Referring to these figures the upper end 51 of the hollow stem is provided with an enlarged bore 52'. Threadably mounted in the upper end of this bore is a sleeve 53 which includes a depending annular wall 54 recessed from the outer margin of the sleeve and which cooperates with the upper end portion 51 of the stem to form an annular chamber 55. At its upper end a suitable packing gland 56 is mounted on the sleeve. Between this gland and a shoulder 57 in the interior of the stem an annular chamber 58 is provided for the accommodation of packing elements. Various types of packing means may be employed in this chamber, however, in the form of the invention shown an annular metal ring 60 is provided beneath the gland 56 and adjacently disposed to this is a body 61 of flexible packing material. Below the packing 61 is a metal spacer ring 62 and below this another flexible packing element 63. At the lower end of the packing chamber a flexible packing 64 is employed and above this a pair of metal rings 65 and 66 respectively which are yieldably forced in opposite directions by means of a coil spring 67.

Within the chamber 55 there is mounted an annular piston generally indicated by numeral 68 which comprises a swivel ring 69, an outer ring 70 provided with internal threads as shown to accommodate a lower section 71 upon which is mounted a resilient annular member 72. Below the member 72 is a metal ring 73. Bearings 74 are interposed between the elements 69 and 70 to permit rotation of the element 69 for a purpose which will hereinafter become apparent. The chamber 55 is adapted to be supplied with a heavy lubricant as by means of the fitting shown in detail in Fig. 5 and generally indicated by reference numeral 75 which communicates with a passage 76 leading to the chamber and yieldably held closed by the ordinary type of valve construction shown at 77. The sleeve 53 is provided with openings 53' for establishing communication between the chamber 55 and the packing means in the space 58.

The lower end of the piston 68 is subjected to the pressure of the fluid or liquid such as rotary mud in the hollow stem 16 by means of suitable communicating passages 78. With this construction the force of the fluid within the hollow stem, wash pipe and associated drilling string is utilized for placing lubricant in chamber 55 under pressure and supplying it to the packing elements at sufficient pressure to preclude the possibility of the escape of rotary mud or the like from the interior of the wash pipe and stem at the point of juncture.

The piston 68 is preferably provided with one or more indicating rods 80 which are mounted in the swivel ring 69 and extend upwardly through suitable openings 81 and 82 in the sleeve and packing gland respectively. A packing is employed at 83 to prevent escape of lubricant. By means of these rods the approximate amount of lubricant in the chamber 55 may be ascertained. With this construction the indicator rods decrease the effective area of the upper surface of the piston which is exposed to the lubricant within the chamber 55 so that this area is less than that subjected to the pressure of the rotary mud or other fluid within the hollow stem, thereby making it possible to place the fluid in the chamber 55 at a slightly greater pressure than the rotary mud. Thus, there will be a tendency for the lubricant to gradually escape in both directions outwardly through the various packing means and prevent the escape of rotary mud from the stem and wash pipe into the region of the packing and to the exterior thereof.

In order to prevent escape of oil from the reservoir 36 an annular oil retainer housing 85 is provided mounted on an inwardly extending flange 86 of the outer housing by means of suitable bolts 87 (see Fig. 2) which extend through oppositely disposed flanges 88 on the oil retainer housing. Between the portion 51 of the stem and this oil retainer housing there is provided a sealing means 90 comprising a pair of seals 91 separated by spacer ring 92. A suitable dust cap 93 is mounted between the upper end of the stem 51 and the sleeve 53.

It is obvious from this description that the gooseneck 14 and its associated wash pipe 50 may be readily removed from the remainder of the swivel to renew any parts of the stuffing box or packing means employed in the region of the juncture of the lower end of the wash pipe and the upper end of the stem and generally indicated by numeral 52.

It is contemplated that various changes and modifications may be made in the structure without departing from the invention and it is intended to cover such changes and modifications as come within the scope of the claims.

I claim as my invention:

1. In a swivel, an outer housing provided with a pair of spaced bail pins at its upper end, said housing including an annular portion of substantial length extending below said pins and terminating in an opening; a bail mounted on said pins; an inner housing mounted in the opening in the lower end of said outer housing and extending upwardly therefrom; a plurality of annular rows of anti-friction bearings mounted in said inner housing one above the other; a hollow stem supported by said bearings in concentric relation to said inner housing; said inner and outer housing cooperating to form a lubricant reservoir chamber; a lower case mounted on the lower end of said outer housing having packing means engaging said stem; means including said lower case for providing communication from the lower end of said lubricant reservoir to the lowermost row of bearings; and an impeller mounted on said stem and rotatable therewith for circulating a lubricant from said case and lubricant reservoir through said bearings.

2. In a swivel: an outer housing provided with a pair of spaced supporting pins at its upper end, said supporting pins being within the periphery of the outer housing and said housing including an annular portion of substantial length extending below said pins and terminating in an opening; a bail mounted on said pins; an inner housing rigidly mounted in the opening in the lower end of said outer housing and extending upwardly therefrom in spaced relation to the outer housing forming an annular lubricant reservoir chamber; a plurality of annular rows of anti-friction bearings mounted in said inner housing supported therein by said inner housing one above the other; a hollow stem journalled in and wholly supported on said bearings in concentric relation to and in said inner housing; said reservoir chamber being open at its upper end to the interior of the upper end of said inner housing and having an outlet at its lower end communicating with the interior of the lower end of said inner housing; and means enclosing the lower ends of said housing.

3. In a swivel: an outer housing provided with a pair of spaced bail pins at its upper end within the periphery of the outer housing, said housing including an annular portion of substantial length extending below said pins and terminating in an opening; a bail mounted on said pins; an annular bearing housing rigidly mounted in the opening at the lower end of said outer housing and extending upwardly therein a substantial distance, said bearing and outer housings being independent of each other except at their region of attachment at their lower end portions; a plurality of annular rows of anti-friction bearings mounted within said bearing housing one above the other and engaging each other; and a hollow stem journalled in and supported on said bearings.

4. In a swivel: an outer housing provided with a pair of spaced bail pins at its upper end within the periphery of the outer housing, said housing including an annular portion of substantial length extending below said pins and terminating at its lower end in a thickened portion defining a screw threaded opening at the lower end; a bail mounted on said pins; an annular bearing housing threaded into the opening at the lower end of said outer housing and extending upwardly therein a substantial distance in spaced relation to the outer housing, said bearing and outer housings being independent of each other except at their region of attachment; a plurality of annular rows of anti-friction bearings mounted within said bearing housing one above the other; and a hollow stem journalled in and supported on said bearings.

WALTER E. KING.